Patented Dec. 24, 1929

1,740,518

UNITED STATES PATENT OFFICE

ERNEST B. MILLER, OF BALTIMORE, MARYLAND, ASSIGNOR TO THE SILICA GEL CORPORATION, OF BALTIMORE, MARYLAND, A CORPORATION OF MARYLAND

ALKALINE STORAGE BATTERY

No Drawing.　　Application filed August 4, 1928.　Serial No. 297,554.

This invention relates to storage batteries, and more particularly to iron-nickel storage batteries in which the active mass associated with the negative electrode or plate consists essentially of an iron oxide gel.

In the so-called iron-nickel storage batteries as now proposed the active mass associated with the iron electrode or negative plate usually consists of an oxide of a metal such as iron oxide. Forming a part of this active mass is also a small percentage of yellow oxide of mercury, usually about 6%. The other plate or depolarizing electrode of the battery is usually made of nickel. The electrolyte commonly employed in batteries of this type is an alkaline solution such as potassium hydroxide. During the charging of the battery the iron oxide contained in the active mass is reduced to metallic iron. The reaction which takes place at the iron electrode during the charging of the battery may be expressed as follows:

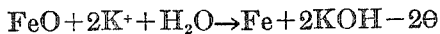

During the discharge of the battery the metallic iron is oxidized to the oxide of iron. This reaction may be expressed as follows:

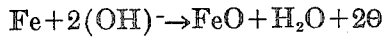

Various oxides of iron and compounds of iron have been employed as the active mass in batteries of this type with varying degrees of success. The capacity of batteries employing the many different oxides of iron as the active mass varies greatly due to the fact that the mass of such material is of such nature as to prevent intimate contact of the electrolyte solution with the individual particles of the oxide of the metal forming the mass. It has been found that the capacity of the iron-nickel battery using an alkaline solution such as potassium hydroxide as an electrolyte, can be considerably increased, especially when the battery is discharging at a high rate, by employing as the essential constituent of the active mass, an iron oxide gel. It is to be understood that the other materials of the active mass including the 6% of yellow oxide of mercury are the same as now employed.

The iron oxide gel utilized as the essential constituent of the active mass associated with the iron or negative plate of the battery, may be termed either a ferria gel, ferric hydroxide gel, ferric oxide gel, or hydrous iron oxide gel.

One method of preparing the iron oxide gel comprises bringing together a solution of a soluble salt of iron such as iron chloride and a solution of a soluble alkali, such as ammonium or sodium hydroxide, with agitation, the concentrations and proportions of the two solutions being such that the resulting mixture is faintly alkaline. The mixing is effected at as low a temperature as is feasible, preferably at a temperature not above 10° C. A gelatinous precipitate forms which is washed thoroughly with water so as to free it of reaction salts. The iron hydroxide precipitate is then dried by subjecting it to a stream of air at a temperature of 75° to 120° C., and then gradually increasing the temperature to 300° to 400° C.

The iron oxide gel thus produced is of a reddish brown color, and is rather brittle. It possesses ultra-microscopic pores, and is capable of being used as an adsorbent.

The advantage of employing iron oxide gel in a storage battery of this type as compared to other forms of iron oxides is that the gel due to its peculiar pore structure presents a much greater surface area to the electrolyte, and hence, the battery has a lower current density under all conditions. This results in the battery having a more constant or uniform voltage, a lower internal resistance, and a much longer life, than in batteries in which the active mass is not so constituted. Furthermore, the battery is capable of becoming quickly charged after it has been discharged irrespective of whether the discharge has been at a low or high rate, and also necessitates less current for recharging.

Having described this invention, what is desired to be secured by Letters Patent is set out in the appended claims.

1. A plate for a storage battery including iron oxide gel as the active mass.

2. A plate for a storage battery of the alkaline type including iron oxide gel as the active mass.

3. A negative plate for a storage battery of the alkaline type including iron oxide gel as the active mass.

4. In a storage battery of the alkaline type, a negative plate including iron oxide gel as the active mass.

5. In a storage battery of the alkaline type, an iron negative plate having iron oxide gel in the active material associated therewith.

In testimony whereof I hereunto affix my signature.

ERNEST B. MILLER.